(12) United States Patent
Meents et al.

(10) Patent No.: US 7,474,998 B2
(45) Date of Patent: Jan. 6, 2009

(54) SIMULATION OF PRODUCTION PROCESSES BY MEANS OF CONTINUOUS FLUID MODELS

(75) Inventors: Ingo Meents, Mainz (DE); Horst Zisgen, Heidesheim (DE)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 11/178,063

(22) Filed: Jul. 8, 2005

(65) Prior Publication Data

US 2006/0047488 A1 Mar. 2, 2006

(30) Foreign Application Priority Data

Aug. 26, 2004 (EP) .................................. 04104090

(51) Int. Cl.
*G06F 17/10* (2006.01)
(52) U.S. Cl. ................... 703/2; 703/9; 700/31; 700/32; 700/108
(58) Field of Classification Search ...................... 703/2, 703/6, 22, 9; 700/28–32, 47, 108
See application file for complete search history.

(56) References Cited

U.S. PATENT DOCUMENTS 6,922,593 B2 * 7/2005 Weiss .......................... 700/30

2003/0158611 A1 * 8/2003 Weiss .......................... 700/31
2006/0015305 A1 * 1/2006 Weiss ............................. 703/2
2006/0015309 A1 * 1/2006 Weiss ............................. 703/6

OTHER PUBLICATIONS

Rohrer, Automod Product Suite Tutorial (Automod, Simulator, AutoStat), IEEE, Proceedings of the 1999, Winter-Simulation Conference, Dec. 1999, pp. 220-226.*

* cited by examiner

*Primary Examiner*—Russell Frejd
(74) *Attorney, Agent, or Firm*—H. Daniel Schnurmann (57) ABSTRACT

A method of simulating a production process on the basis of a continuous fluid model with discrete time evolution is described. The method of simulating makes use of assigning production and processing resources of various stations of the fluid model to various fluids with respect to a priority identifier of the fluids. Division of the station resources to various fluids is further based on a momentary amount of the various fluids. Based on the assignment of the station resources to the various fluids, the time evolution of the fluid amounts are determined without having to perform time and resource consuming optimization. Additionally, assignment of station resources can be manually and temporarily modified by a fluid manipulation means allowing for a universal and dynamic modification of the behavior of particular stations without interrupting or affecting the entire simulation process.

15 Claims, 6 Drawing Sheets

SIMULATION OF PRODUCTION PROCESSES BY MEANS OF CONTINUOUS FLUID MODELS

BACKGROUND OF THE INVENTION

The present invention relates to the field of simulation of networked processes, and more particularly, to the simulation of a continuous fluid model having a discrete time evolution.

The ability to meet supply commitments is becoming more and more the important differentiating factor of suppliers besides product quality and price. Meeting supply commitments is essential for suppliers especially in a fast paced business with short product life cycles and high volatile demands.

Semiconductor manufacturing as a supplier of camcorder, computer or Gameboy assembly lines is a typical examples of such a chain link in the supply chain of the fast paced consumer electronic industry. Therefore, production management and control in this area must be provided with a planning methodology and tools that allow predicting the movement of work in process and the manufacturing output for a certain period of time in the future.

A planning tool must react instantly and efficiently to variations and changes of a production process, such as machine outages, general machine problems, increased rework rates, varying customer orders, and the like. Specially, in a semiconductor production line such a planning task is challenging. On the one hand, the production process itself is complex and typically features hundreds or even thousands of process steps that need to be performed in a highly interactive manner. On the other hand, typically, a large variety of products with different process flows are processed in parallel. Moreover, such a planning tool can be applied universally to a variety of networked processes that are executed by a plurality of stations, each of which dedicated to execute a specific task. In this way, the planning tool allows planning and simulating a variety of networked processes, such as production processes in manufacturing lines or networked tasks performed, e.g., by various computer systems.

By making use of discrete event simulation tools, the movement of work in process and manufacturing outputs of a production line can, in principle, be forecasted. However, discrete event simulation is time consuming and requires large computing resources. For instance, for a discrete event simulation, it may take several hours to run the simulation of a large manufacturing line, even when using state of the art computing resources. This is due to the empirical nature of the discrete event simulation, i.e., the intermediate products in the production process are treated as discrete entities on a continuous timeframe. By way of example, when a supply chain equally splits into two different production stations, at least two discrete supply events must be simulated in order to account for the equal splitting.

Another approach for simulating production processes is based on a continuous fluid model that is discrete in time. Here, the discrete nature of a manufacturing line is disregarded and the complexity of the simulation model is effectively reduced to an analytical model. As an advantage, this analytical model can be evaluated within a short period of time. Even though the continuous approach is not intuitive, in a build-to-plan production environment, a work piece, such as a wafer, needs not be treated individually. Alternatively, work pieces of the same order and the same product can be combined into volumes and do not need to be considered as individuals either. Hence, they do not differ from a manufacturing point of view. Typically, they follow the same process flow and they can be handled by the same machines with the same process times and featuring the same rework probability.

Therefore, from a scheduling perspective, it is not necessary to determine a certain sequence of individuals, but rather calculate the average amount of work pieces that have to be processed at a certain work station within a certain period of time. This can be achieved by assigning a certain amount of machine capacity to work pieces of a certain product within a certain period of time, which finally yielded to the idea of fluid models.

The publication "Dynamic scheduling of a multi class fluid network" by H. Chen and D. D. Yao, Operations Research, 41:1104-1115, 1993 describes a multi-class fluid network consisting of a plurality of stations, among which several classes of fluids are circulated and processed. At each station, the input flow comes from both external sources as well as internal transitions (including feedbacks), and the output flow goes to other stations or leaves the network following a flow-transfer matrix. Here, the scheduling control of fluid networks can be solved systematically through a sequence of linear programming problems. The control problem is formulated to minimize a linear inventory cost over the entire spectrum, referred to global optimum. Aiming for such a global optimum provides a vehicle to solve the problem: it naturally suggests a systematic solution via a sequence of linear programs, referred to 'myopic procedure', which generates a piece-wise optimum solution. That is, the solution spanning over the entire spectrum is obtained by pasting a finite plurality of pieces; each local optimum being only optimum with respect to its initial state. Further, it is shown that if a global optimum solution exists, it is guaranteed to be generated by the myopic procedure.

Hence, the scheduling of control of fluid networks makes particular use of linear programming and optimization approaches. On the one hand, such an optimization approach requires appreciable computing resources and computing time. On the other, these optimization approaches have basically objective functions with coefficients reflecting the inventory costs associated with a work piece. In particular, in large manufacturing lines a large amount of those cost coefficients need to be defined, which in turn requires manual gathering and continuous maintenance of the cost coefficients.

The present invention therefore aims at providing a simulation of a production process on the basis of a continuous fluid model featuring a shorter simulation time and requiring less computing resources. Moreover, the invention aims to provide autonomous acquisition of input data for the fluid model.

SUMMARY OF THE INVENTION

The present invention provides a method of simulating a production process on the basis of a continuous fluid model with discrete time evolution. The continuous fluid model is provided with a plurality of stations adapted to process fluids. Initially, a first station assigns a first amount of a first fluid, and a second amount of a second fluid. Each of the first and second fluids assigns a priority identifier.

The method of simulating the production process includes executing a successive plurality of simulation cycles. Each simulation cycle includes the step of assigning at a predetermined time the first station resources to the first and second fluids. This assignment is performed on the basis of the priority identifier of the first and second fluids. The simulation cycle further comprises incrementing the predetermined time by a simulation cycle time interval and, thereafter, updating the first and second amounts of the first and second fluids on the basis of the assignment of the first station resources to the first and second fluids.

The simulation cycle is illustrated by a first station of the continuous fluid model. Typically, the simulation cycle includes assigning station resources to appropriate fluids, incrementing the discrete time, and updating the amount of fluids assigned with the station performed simultaneously for all stations of the fluid model. The distribution of the finite resources of each station to competing fluids that are assigned with the station is performed on the basis of the priority identifier that was assigned with each fluid.

By way of example, when the first fluid has a high priority and the second fluid has a low priority, the first station's resources will be assigned to a large degree to the first fluid and only to a low degree to the second fluid. Based on this assignment, the first and second amounts of the first and second fluids can be updated for a successive discrete time. This updating only requires the assignment of the first station's resources to the first and second fluids. General station specific processing information, like the amount of which fluid can be processed by a dedicated station within a simulation cycle time interval. Hence, work in process and the flow of the fluids representing work pieces can be forecasted by only assigning the first station's resources to competing fluids on the basis of a priority scheduling. Hence, instead of applying time consuming optimization routines, the dynamics of work in process movements can be effectively predicted by assuming certain scheduling assumptions. As an advantage, computing resources as well as required simulation time can be effectively reduced.

Moreover, the inventive simulation method is universally applicable in a daily business of managing complex manufacturing lines. For example, the fluid model may be provided with data from a real existing production line reflecting the state of the production line at a particular point of time. Having knowledge of the general station specific processing information and the priority scheduling of the various fluids, the behavior of the complex production line can be calculated in a straight forward manner.

Depending on the requirements of the simulation, the simulation cycle time interval can be freely chosen. This simulation cycle time interval specifies the discrete points of time at which a momentary state of the fluid model is analyzed for assigning the station's resources to a variety of fluids. The updating of a first and second amount of the first and second fluids refers to a point of time (reference time) that is incremented by the simulation cycle time interval. In a successive simulation cycle, this incremented point of time specifies the moment for a repeated assignment of the station's resources to the various fluids.

According to a preferred embodiment of the invention, the first and second stations of the fluid model process the fluid by means of a fluid specific operation. Selection of a fluid specific operation uses a fluid class identifier that is provided by each of the first and second fluids. In this manner, a plurality of several fluids can be assigned by a single operation of the station. Depending on the class code assigned with each fluid, the operation of the station then expands to a fluid specific operation. In this way, the complexity of the continuous fluid model can be reduced further.

When a distinct fluid is processed by a particular station, an operation that corresponds to this distinct fluid can be dynamically selected by making use of the fluid class identifier of this fluid. Thus, the station can dynamically process a large variety of different classes of fluids.

According to a second embodiment of the invention, assignment of the first station's resources to the first and second fluids further comprises a total workload of the first station and the amount of first and second fluid being assigned with the first station. By distributing the station's resources to competing fluids, further use is made of the momentary amount of fluid that has to be processed by the first station. Therefore, an imbalance of first and second amounts of first and second fluids can be effectively compensated for future simulation cycles.

According to a third embodiment of the invention, assignment of the first station's resources to the first and second fluids further comprises a station specific maximum priority threshold. This station specific maximum priority threshold specifies the maximum fraction of the station's total resources that can be assigned to a specific fluid class. Fluid classes are typically specified by a priority identifier assigned to each fluid, effectively preventing that a fluid of high priority absorbs the entire capacity of a station at the expense of fluids with a lower priority.

By way of example, the station specific maximum priority threshold may specify that only 80% of the station's resources can be assigned with fluids with the highest priority identifier. The remaining 20% are effectively reserved for fluids featuring a lower priority identifier. This effectively guarantees that even fluids of low priority are processed at a distinct rate.

According to a further embodiment of the invention, assignment of the first station's resources to the first and second fluids further comprises a fluid specific maximum priority threshold. The maximum fraction of the station's resources that can be assigned to a single fluid can be effectively restricted, preventing that a single fluid be dedicated with the total resources of the first station. Consequently, by means of the fluid specific maximum priority threshold, one can effectively guarantee that the entire station's resources be divided between two competing fluids.

According to still a further embodiment of the invention, assignment of the first station's resources to the first and second fluids uses a first in first out (FIFO) schedule. Since the fluid model does not identify distinct work pieces, in this context, the FIFO schedule always refers to a first-in first-out model or an approximation thereof. The FIFO schedule approximation is applied to fluids that have assigned a corresponding priority identifier. Hence, the FIFO schedule represents a distinct priority identifier. Typically, such a FIFO identifier features a lower priority than a high priority identifier and features a higher priority than a low priority identifier. The FIFO schedule further represents a queuing schedule. Hence, competing fluids are processed by the first station in the order of incidence to at least the first station.

According to yet a further embodiment of the invention, assignment of the first station's resources to the first and second fluids comprises the steps of: assigning a first fraction of the first station's resources to fluids with a highest ranked priority identifier, assigning a second fraction of the first station's resources to fluids with the first in first out priority identifier, and assigning a third fraction of the first station's resources to fluids with a lowest ranked priority identifier.

In this context, the third fraction is the residual fraction of the total resources of the first station. The residual fraction is determined by subtracting the first and the second fraction from the total resources of the first station. Hence, assigning the first station's resources to various fluid classes of different priority can be performed in three successive steps. First, the high prioritized fluids are assigned with a first fraction of available resources of the station. Second, the medium prioritized fluids, i.e., those featuring a first-in first-out priority identifier are assigned with a second fraction of the remaining three resources of the first station. Finally, the residual fraction of the total resources is assigned to fluids featuring the lowest ranked priority identifier.

In particular, the resources or total resources of the first station can be expressed in terms of time intervals expressed in fractions or units of simulation cycle time interval. Typically, a fraction of the total resources of the first station refers to a corresponding fraction of the simulation cycle time interval, for which the station dedicates its entire processing capacity to this particular fluid.

Assignment of the first, second and third fractions strongly depend on station- and operation specific maximum priority threshold as well as on the amount of competing fluids that have to be processed by the first station. The three levels of priority, in particular high priority, FIFO priority scheduling and low priority are only examples of various priority identifiers. The invention is not limited to only three different types of priority classes. Generally, a large number of different priority classes can be universally implemented in order to prioritize the different fluids.

Additionally, a further division of, e.g., a high priority classifier into various sub priorities is generally conceivable. This further prioritizes the fluids that feature the same high priority identifier. This may, for example, be relevant in situations where only high priority fluids are present at a station and when the station's resources are insufficient to process the competing fluids within a desired time interval.

According to still another embodiment of the invention, assignment of the first station's resources to the first and second fluids further uses the processing time of the first and second fluids of the first station. In this way also the processing time that varies for the first and second fluids can be effectively taken into account for assigning of the first station's resources to the first and second fluids.

Generally, assigning of the first station's resources to the first and second fluids can be effectively expressed as a fraction of the simulation cycle time interval, given that for such a fraction the entire processing capacity of the station is dedicated to a single fluid. For example, three competing fluids have to share the resources of a single station. Due to different priority identifiers of the three fluids, e.g., the first fluid may be assigned a fraction of 0.4, the second fluid might be assigned a fraction of 0.4 whereas the third fluid may be assigned a fraction of 0.2 of the simulation cycle time interval. Hence, during a simulation cycle time interval, the station dedicates 40% of its total capacity to the first and the second fluid and 20% of its production or processing capacity to the third fluid.

This is only one way of describing assignment of station resources to various fluids. The internal handling of the station of how to assign its resources to various fluids can vary. For example, the different fractions of the total resources might be simultaneously assigned to the various fluids over a complete simulation cycle time interval.

According to yet another embodiment of the invention, the method further comprises assigning fluid manipulation means to the first station. These fluid manipulation means are adapted to transfer the first fluid into the second fluid. For instance, the fluid manipulation means provides labeling of fluids by transferring an amount of fluid between any two fluids. This transfer can be performed prior to processing of the first fluid by means of the first station or after such a processing. Transferring and/or interchanging amounts of first and second fluids allow to selectively manipulating the workload of various operations of a station. Any imbalance between the amount of first and second fluids can be intuitively compensated. This allows for a selective and manual manipulation of workloads that are present at the operations of the stations. Such a manual and selective manipulation is advantageous when a particular fluid needs marking. For example, by transferring an amount of the first fluid into an empty fluid buffer of an operation that is dedicated to the second fluid, the transferred amount of the first fluid will typically end up in a different output buffer or different station than the amount of the first fluid not transferred.

BRIEF DESCRIPTION OF THE DRAWINGS

In the following preferred embodiments of the invention will be described in detail by making reference to the drawings in which.

DETAILED DESCRIPTION

Figure 1:
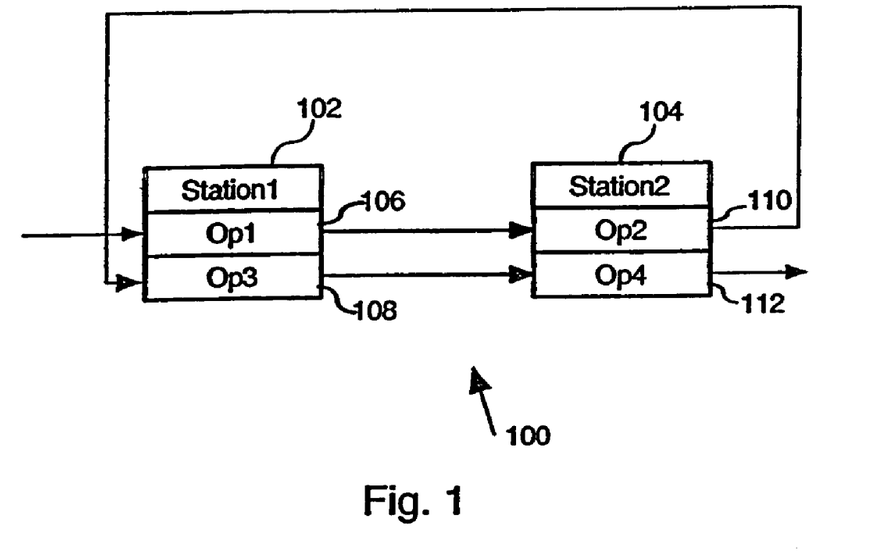
FIG. 1 shows a schematic block diagram of a basic continuous fluid model having two stations.

FIG. 1 shows a schematic block diagram of a continuous fluid model 100 having two stations 102, 104, each of which having two operational modes By way of example, this block diagram only illustrates a basic embodiment that explains the methodology of the inventive simulation. It is by no means restricted to the illustrated number and configuration of the illustrated stations and fluids. In a realistic scenario, e.g., when simulating a production line for the manufacturing semiconductor components, a fluid model covers thousands of individual stations and at least a comparable number of fluids.

In the simplified model shown in FIG. 1, station 1 102 performs operation 1 106 and 3 108, whereas station 2 104 performs operation 2 110 and 4 112. Work pieces in the amount of fluid entering the fluid model 100 at operation 1 106 as indicated by an arrow pointing to operation 1. This first fluid represents an average amount of work pieces to be processed by operation 1 106, typically entering operation 1 by means of a fluid buffer that serves to store an amount of the incident fluid.

After processing the first fluid by way of operation 1 106, the processed fluid enters operation 2 110 of station 2 104, as the second fluid. Similarly, the second fluid may be stored in a fluid buffer that is associated with operation 2 110. The fluid buffers generally controls the queuing of fluids prior to their being processed by the station.

The output of operation 2 110 serves as an input of operation 3 108 of station 1 102. Hence, after processing operation 2 110, the process flow re-enters station 1 102. Similarly, after processing operation 3 108, the process flow continues with operation 4 112 of station 2, and the work pieces re-enter station 2 104. After processing operation 4 112, the respective fluid exits the continuous fluid model as an outflow.

It is to be noted that each fluid is assigned exactly one operation of the station. Hence, a first fluid is incident at operation 1 106, a second fluid is incident at operation 2 110, a third fluid is incident at operation 3 108 and a fourth fluid is incident at operation 4 112. From a work piece point of view, operations 1, 2, 3, 4 are processed in a sequential way. Hence, an incident work piece in form of the first fluid is sequentially processed by operations 106, 110, 108, 112. Scheduling the control of the fluid network is now based on assigning the resources of station 1 102 and the resources of station 2 104 in an intelligent way to the various operations 106, . . . 112.

The assignment of the station's resources depends on the priority identifier of the various fluids that are incident at the station and on the corresponding fluid buffer level, i.e., the amount of fluid. For example, assigning almost the entire resources of station 1 102 to operation 1 106, leads to an imbalance between processing the first and the third fluid. In this case, only the first fluid is processed at the expense of processing the third fluid. Consequently, the fluid buffer level of operation 1 106 may decrease, leading to an increase of the fluid buffer level of operation 2 110.

By further assuming that operation 2 110 processes a certain amount of fluid, the second fluid to be processed re-enters station 1 102 at operation 3 108. Since the entire capacity of station 1 is assigned to operation 1 106, the fluid buffer level of operation 3 108 increases significantly. Since operation 3 has not yet assigned the resources of station 1 102, it cannot process the third fluid. Consequently, operation 4 112 will not be provided with the input from operation 3 108, and the total output of operation 4 112 will tend to vanish.

In order to provide an optimum scheduling to the fluid processing, it is advantageous to assign the resources of stations 102, 104 to their corresponding operations in a dynamic and flexible way depending on, e.g., the fluid buffer level, the priority of fluids, and eventually the processing time of the operations. By way of example, when the fluid buffer of operation 3 108 is empty, it might be reasonable to assign the entire capacity of station 1 102 to operation 1 106. Whenever the fluid buffer level of operation 3 108 is not zero, operation 3 108 will be assigned at least a certain fraction of the station's resources in order to prevent a disproportional increase of the fluid buffer level.

Figure 2:
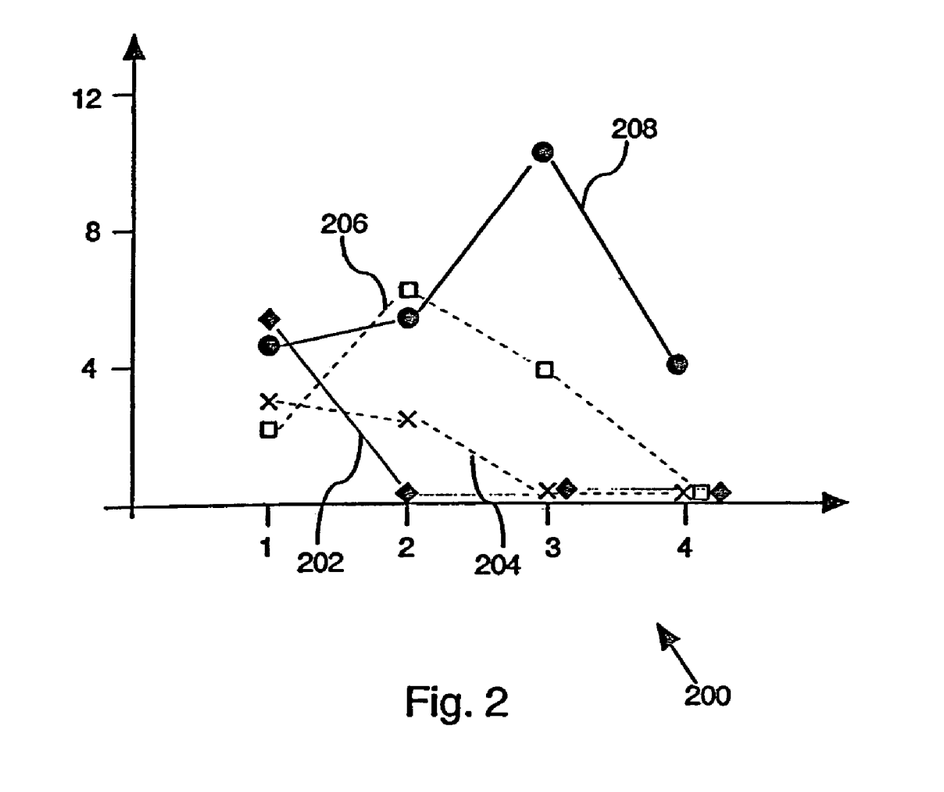
FIG. 2 illustrates a diagram reflecting the work in process via time for the continuous fluid model of FIG. 1.

FIG. 2 illustrates the fluid buffer levels of operations 106, 108, 110, 112 over time in a work in process diagram 200. The fluid buffer level, i.e., the amount of fluid (given in arbitrary units) reflects the quantity of, e.g., work pieces that have to be processed by the appropriate operation. The time is given in multiples of the simulation cycle time interval. At time 1, the fluid buffer levels of operations 106, . . . , 112 is in the range from 2 to 5.

The graph 202 corresponds to the fluid buffer level of operation 1 106, and graph 208 corresponds to the fluid buffer level of operation 3 108. Graph 206 corresponds to fluid buffer level of operation 2 110, and graph 204 corresponds to the fluid buffer level of operation 4 112.

Comparing the fluid buffer levels at times 1 and 2, it is observed that the fluid buffer level of operation 1 106 decreases, whereas fluid buffer level of operation 110 increases. With respect to graph 202, the entire fluid buffer level of operation 1 106 is emptied at the first simulation cycle time interval. Similarly, the fluid buffer level 206 of operation 2 110 increases and reaches its maximum at time 2. Since at time 2 there is nothing left to process for operation 1 106, the input of operation 2 110 cannot further increase. However, in the following operation 2 110, the second fluid is processed, and the graph 206 it decreases and reaches 0 at time 4 as can be observed by looking at graph 208, the fluid buffer level of operation 3 108 increases as a result of processing the second fluid by way of operation 2 110. Assuming that the stations feature a comparable production capacity, for a smooth processing and for optimum efficiency of the entire production process, it is advantageous to keep the fluid buffer levels within a predefined range, i.e., the evolution of a peak of graph 208 at time 3 has to be prevented.

Other scenarios are also conceivable when, e.g., a distinct station features a production or processing capacity that is far above the production capacity of other stations. In such an instance, it may be advantageous to build up the high fluid buffer level for the particular station. In general, an optimum flow of the fluids over time strongly depends on the geometry and the individual production parameters of the stations of the fluid model.

Figure 3:
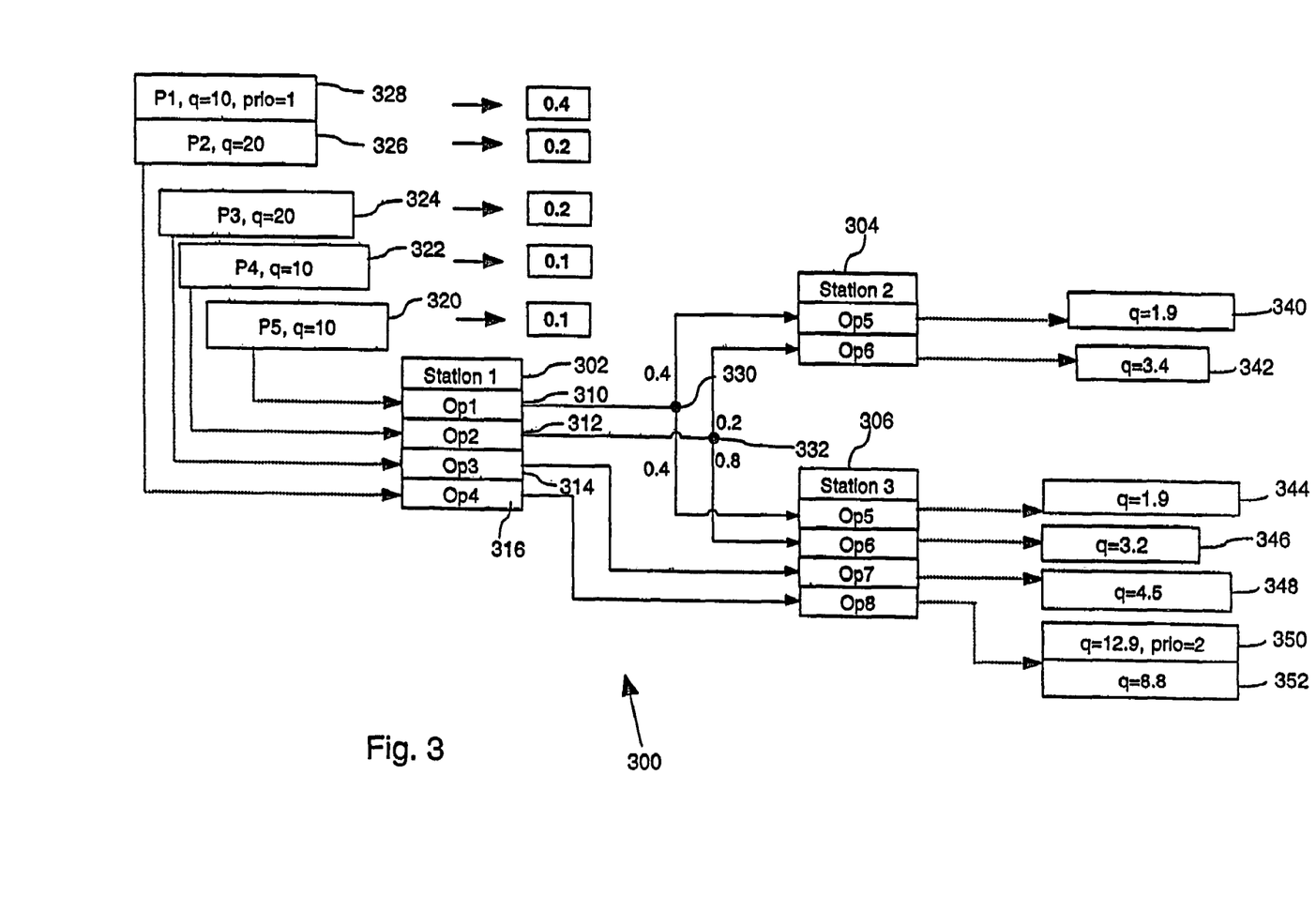
FIG. 3 shows a detailed block diagram of another continuous fluid model.

FIG. 3 shows a block diagram of another continuous fluid model 300 having three stations 302, 304, 306 featuring numerous operations. For instance, station 1 302 performs operation 1 310, operation 2 312, operation 3 314 and operation 4 316. Respective fluids that are incident at the operations 310 . . . 316 of station 1 302 are illustrated as P1 328, P2 326, P3 324, P4 322 and P5 320. A parameter queue is assigned to each of the fluids P1 . . . P5 representing the amount of fluid. Additionally, fluid P1 328 is assigned a priority identifier indicating the highest priority. Other fluids 320 . . . 326 also have assigned a priority identifier in the form of a default priority identifier (that is not explicitly illustrated). The default priority identifier may refer to, e.g., a FIFO scheduling.

Depending on the priority identifiers and depending on the amount of fluid q the resources of station 1 302 are assigned or distributed among the various incident fluids 320 . . . 328. As illustrated, fluid P1 328 is assigned with 0.4, fluid P2 326 to 0.2, fluid P3 324 to 0.2 and P4 and P5 322, 320 are assigned 0.1 of the total capacity of station 1 302. The fractions of the total capacity of the station 1 302 that are assigned to the various fluids P5 . . . P1 320 . . . 328 are given in fractions of the simulation cycle time interval by assuming that the total capacity of station 1 302 is assigned a fluid for the duration of the fraction of the simulation cycle time interval.

In the illustrative example, the total resources or capacity of station 1 302 is denoted by operation 4 316 during a duration of 60% of the simulation cycle time interval, because operation 4 316 serves to process the fluids 326 and 328 that are assigned 0.2 and 0.4 of the simulation cycle time interval, respectively. Even though fluid 328 has only an amount of 10, it is assigned with most of the station's resources compared to the remaining fluids 320, . . . , 326. This is due to the high priority that was assigned to fluid 328.

Comparing fluid P3 324 and fluid P4 322 featuring an equal priority but vary with respect to their amounts, the station's resources are assigned proportional to the respective amount of fluid. In this way, fluid 324 is assigned 0.2, and fluid 322 is assigned 0.1 of the total resources of station 1 302.

Typically, assignment of resources is only valid for the successive simulation cycle time interval. Based on the assigned resources of station 1 302 to the various incident fluids 320, . . . 328 and on the general station processing information, a resulting amount of fluids can be calculated at a point of time that is incremented by the simulation cycle time interval.

As illustrated in FIG. 3, the output of operation 3 314 is connected to the input of operation 7 of station 3 306 and the output of operation 4 316 is connected to an input of operation 8 of station 3 306. Output of operation 1 310 enters the node 330 separating the flow of the output fluid in equal quantities to operations 5 of station 2 304 and station 3 306. As indicated by the numbers 0.4, only 40% of the output of operation 1 310 enters operation 5 of station 2 304, and 40% of output of operation 1 310 enters operation 5 of station 3 306. The remaining 20% is outage or scrap that is not processed further. Similarly, output of operation 2 312 enters 332 that splits unevenly the incoming fluid from operations 6 of station 2 304 and station 3 306.

Quantitatively, 20% enters station 2 304 and 80% enters station 3 306. Assignment of station resources or production capacity to the various operations of station 304 and 306 is performed in a similar manner, as illustrated with reference to station 1 302. As can be seen with regard to the fluids 340, . . . , 352 generated by station 304, 306, the amount of fluid that is processed fluid does not have to be represented by an integer number. This reflects the inherent nature of a continuous fluid model.

Figure 4:
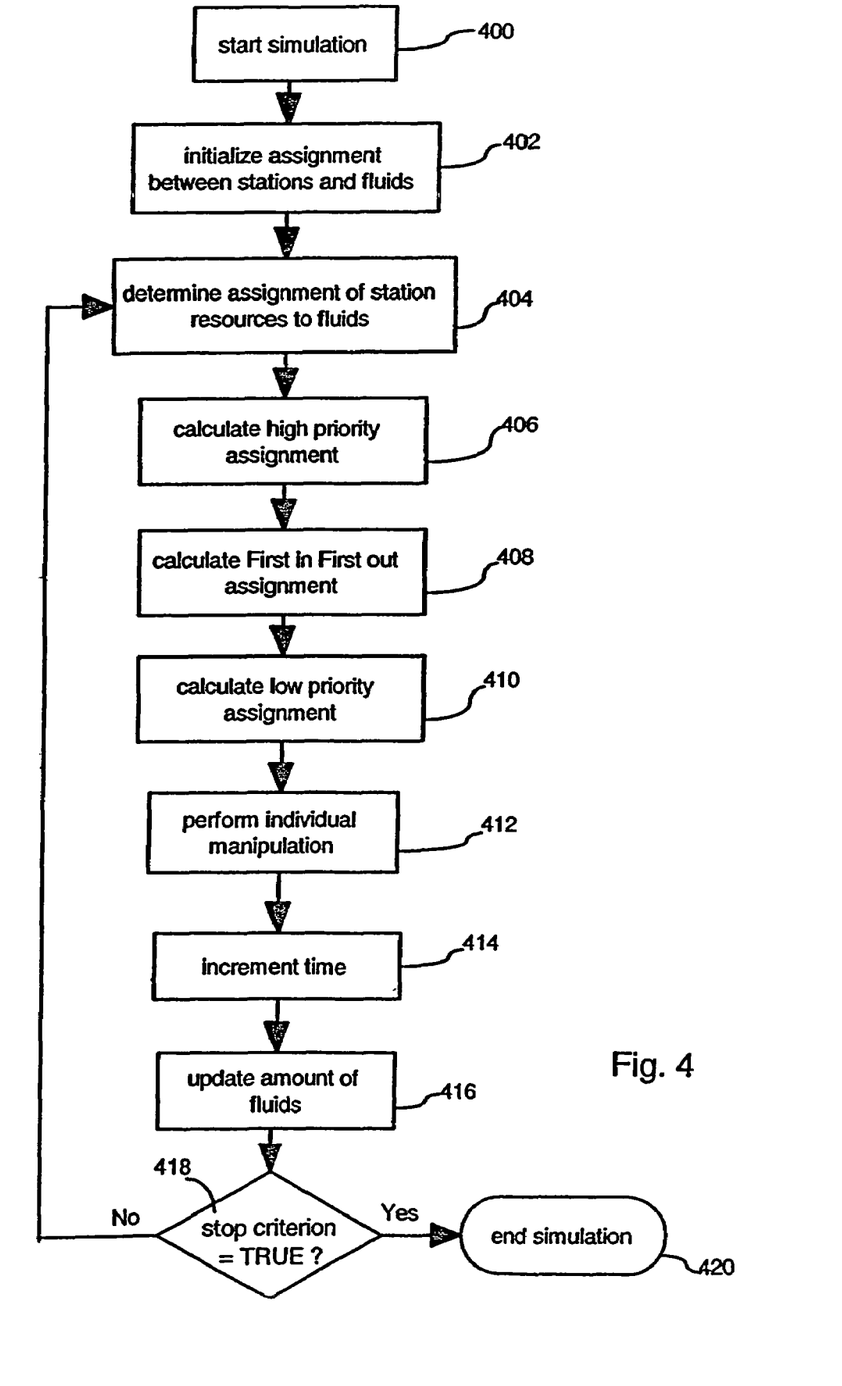
FIG. 4 shows a flowchart of the main simulation method, according to the present invention.

FIG. 4 is illustrative of a flowchart of the main simulation for calculating the amounts of fluid and, hence, the flow of work pieces for successive points of time. The simulation begins at step 400. In step 402, initial assignments of stations and fluids, i.e. amounts of fluids, are performed. Initialization not only refers to determining the fluid buffer levels but also to the assignment of priority identifiers to the various fluids.

By means of this initialization procedure the various fluids of the fluid model are assigned with different priorities. For instance, initialization can be performed in an autonomous way by making use of a data gathering system, such as a shop floor control system providing realistic input data from a real existing production line.

Depending on the initialization performed in step 402, in step 404, the assignment of station resources to the fluids takes place. This assignment is preferably performed on the basis of priorities being assigned with the various fluids and the momentary fluid buffer levels. In particular, the distribution of a station's production capacity for a simulation cycle time interval successively incorporates steps 406, 408 and 410. In step 406, the high priority assignments are calculated. In step 408, the first-in, first-out assignments are provided. In step 410, the low priority assignments are established. Accordingly, the assignment of station resources to fluids is performed in a sequential way and in the order of decreasing priority starting with the highest priority identifiers.

More particularly, in step 406 a calculation of the assignment of station resources to fluids featuring a high priority identifier is performed with respect to the station specific maximum priority threshold and/or the fluid specific maximum priority threshold. This effectively guarantees that a certain fraction of the total processing capacity of a station is reserved for lower prioritized fluids. In step 408, the assignment of station resources to fluids is performed by means of a FIFO scheduling. Such a FIFO scheduling refers to the queuing of the incident fluids, wherein various fluids with a FIFO priority equally share the remaining station's resources.

In step 410, a low priority assignment is calculated for the case that where the total resources cannot be entirely distributed among high priority and FIFO priority scheduled fluids. This low priority refers to instances where the fluid is processed when the station is idle, i.e., when it features residual capacity after assigning resources to the higher prioritized fluids. This may also occur when a certain fraction of the station's resources are reserved for such low priority fluids. It can be achieved in practice by specifying an upper threshold for the high priority and FIFO-priority assignments.

The determination of the station's resources to fluids having various priorities is performed in step 406 through step 410, although it is by no means restricted to only three different types of priority identifiers. Moreover, numerous different priority classes can be specified and the corresponding assignment procedure can be adapted thereto. After assigning or distributing the resources of the station to the various fluids, individual fluid manipulations can be performed in step 412. For example, a distinct amount of a first fluid can be temporarily or permanently transferred to a second fluid.

In particular, when the second fluid buffer is empty, this transfer identifies the fluid that has been processed during a particular time interval. For example, assuming that the fluid buffer of operation 3 314 is empty. Then, transferring a certain amount of fluid 322 to fluid 324 effectively allows to identify the transferred portion at the end of the production process at the output fluid 348. This is useful if the station has not been sufficiently tested and therefore may produce a disproportional amount of scrap.

The individual manipulation performed in step 412 is also useful for manually balancing amounts of fluids that are incident at the station or generated by the station. For example, when a station generates a first and a second fluid and the first fluid having an amount of 50, and the second fluid has an amount of 10, it may be useful to manually instruct the station to exclusively process the second fluid for the next production or simulation cycles in order to restore a balance between the first and second fluid amounts.

Alternatively, step 412 may also be performed prior to determining the assignment of station resources performed in step 404. Hence, this individual manipulation performed in step 412 is the step to be instantaneously performed within the simulation cycle. The manipulation itself, i.e., the transfer of amounts of fluids itself, is performed in zero time, hence such a fluid transfer does not require a time interval or a fraction of a simulation cycle time interval.

After the individual manipulation and assignment of station resources to the fluids have been completed, the discrete point of time is incremented by one simulation cycle time interval (Step 414). After incrementing the point of time to the next point of time in step 416, new amounts of fluids are calculated. This determination is based on the assignment of station resources to the various fluids as well as to the general station processing information, e.g., how much of a certain fluid can be processed by a distinct station within a simulation cycle time interval. After calculating the new amounts of fluid, a stop criterion is checked in step 418. This stop criterion can be defined in different ways, e.g., by way of a predefined number of simulation cycles, or a predefined amount of a certain fluid at a certain station, or when the production flow has reached a stable equilibrium. When the stop criterion is activated, the simulation ends in step 420. Otherwise, if the stop criterion is not yet achieved, the method returns to step 404 and the assignment of station resources is recalculated on the basis of the updated amount of fluids that been calculated in step 416.

Figure 5:
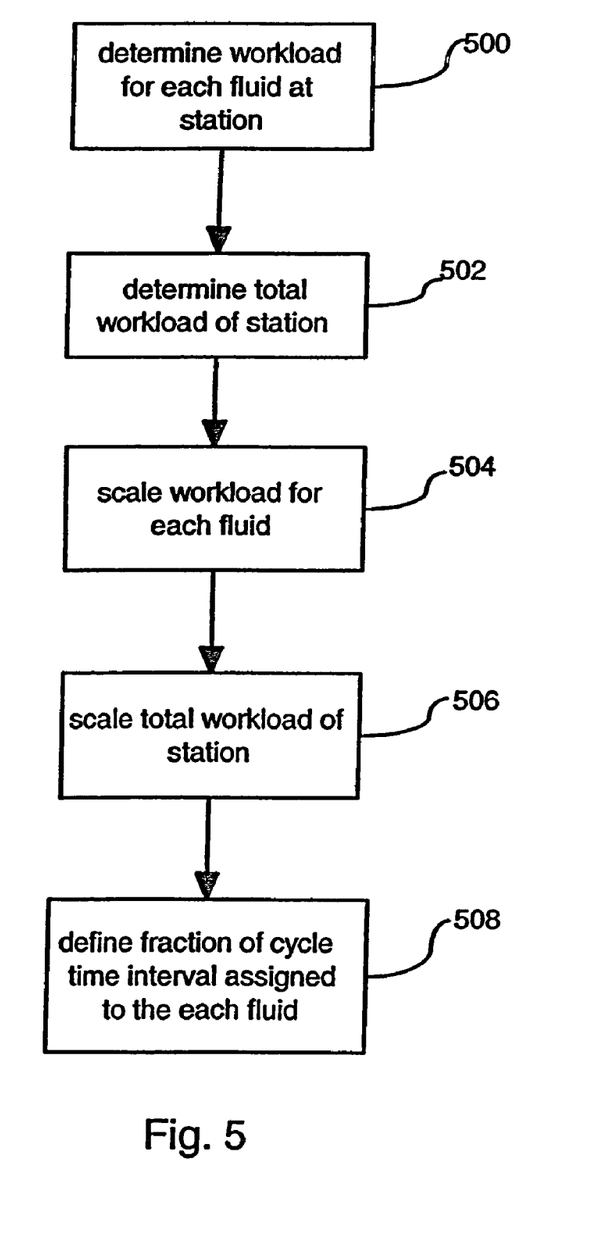
FIG. 5 illustrates a flowchart for assigning the station's resources to high priority fluids.

FIG. 5 is illustrative of a flowchart for assigning the resources of a station to a fluid featuring the highest priority. In step 500, the workload for each fluid at the station is determined. The workload is typically defined as the ratio between the amount of incident fluid and the amount of emanating fluid. Additionally, the workload might be scaled by a reliability factor representing outage that may be produced by the station.

In step 502, the total workload of the station is determined, typically by adding the workload of each fluid that is processed by the station. Next, in step 504, the workload of each fluid is scaled to a maximum allowable fraction. This effectively prevents that a single fluid be assigned a disproportionate fraction of the station's resources. In step 506, the total workload of the station is scaled correspondingly. This effectively prevents that the entire processing capacity of the station be assigned to a single class of fluids featuring, e.g., the highest priority.

In the final step 508, a ratio of cycle time interval for each fluid is calculated and assigned. Typically, this ratio is the product of the station maximum priority threshold multiplied by the reliability factor, and multiplied by the ratio between the scaled workload for the fluid and the scaled total workload of the station.

Figure 6:
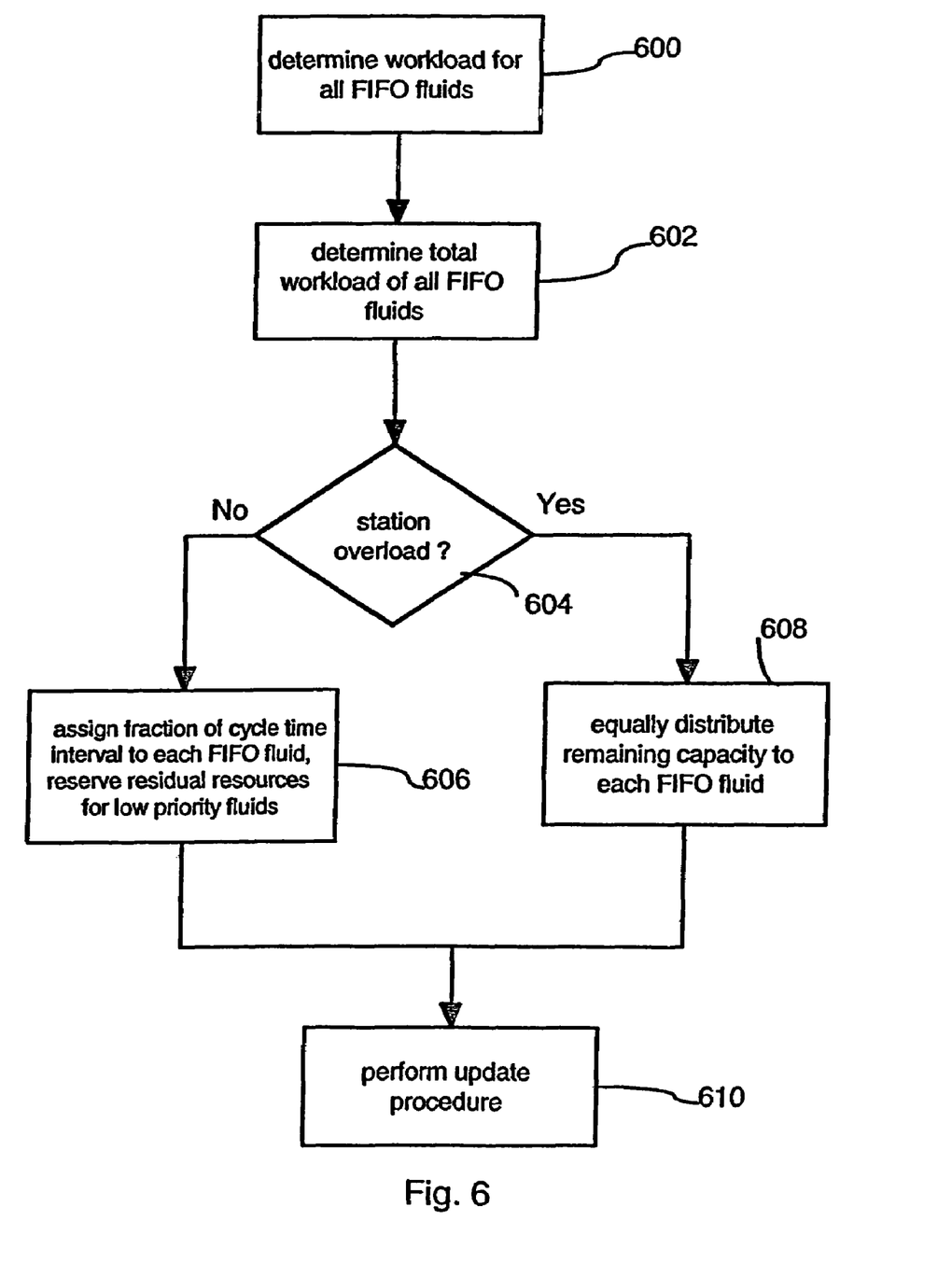
FIG. 6 illustrates a flowchart for assigning the station's resources to various fluids by making use of the first-in first-out schedule.

FIG. 6 is illustrative of a flowchart for assigning the station's resources according to the first in first out scheduling. In step 600, the workload of each fluid featuring the FIFO priority is determined. Next, in step 602, the total workload of all FIFO fluids that are incident at the station is determined. Determining the workload of the fluid and of the total workload of the fluids of the FIFO priority class are performed in a manner that is similar to the steps 500 and 502 in FIG. 5.

After determining the total workload of all the FIFO scheduled fluids, a check is performed to determine whether the station's remaining processing capacity is sufficient to process the FIFO fluids. In case when there is no station overload, i.e., the station has enough free resources to process all the FIFO fluids, and the method continues with step 606, where corresponding fractions of cycle time intervals are assigned to each FIFO fluid and where a residual free capacity of the station is passed on to the low priority fluids of the station. In the opposite case where in step 604 it is determined that the station's free processing capacity is not sufficient to process all incident FIFO fluids, the free capacity of the station is equally distributed to the FIFO fluids (Step 608). The method in both cases proceeds with step 610, where an update is performed following steps 606 and 608.

In step 610, the time is incremented and the amount of fluids is updated. Assignment of resources of the station to the fluids featuring the lowest priority is performed in a similar way as the assignment to high priority fluids, except that only one residual fraction of the station's resources is to be distributed among the low priority fluids.

Figure 7:
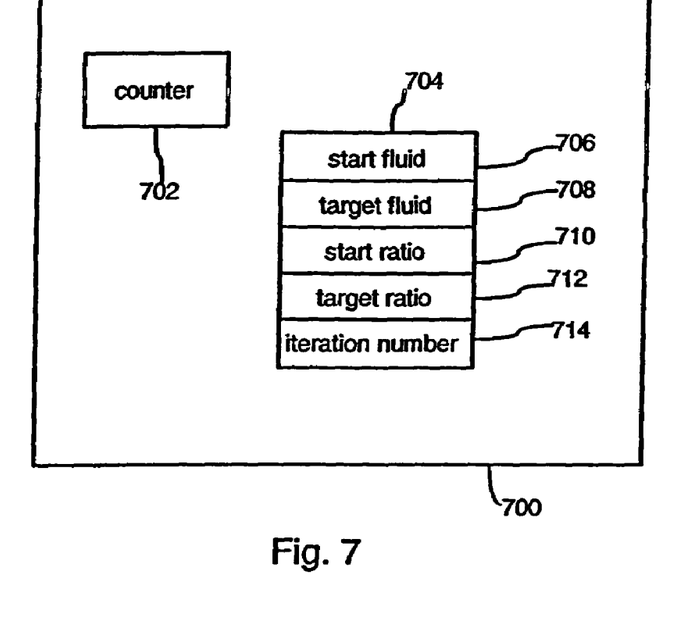
FIG. 7 shows a schematic block diagram of the structure of the fluid manipulation means.

FIG. 7 shows a schematic block diagram of a fluid manipulation means. Fluid manipulation means 700 typically have a counter 702 and a description block 704. Typically, the description block 704 provides necessary information for manipulating any two fluids of the fluid model. Therefore, the description block 704 has five separate entries 706 through 714 describing the start fluid 706, the target fluid 708, the start ratio 710, the target ratio 712 and an iteration number 714.

Alternatively, the fluid manipulation means 700 may have a plurality of description blocks, each of which making use of the common counter 702. In this way, the fluid manipulation means is not restricted to the manipulation of any two fluids but can process an arbitrary amount of fluids.

The start fluid entry 706 specifies from which fluid an amount of fluid has to be transferred. The entry 708 specifies the target fluid to which the amount taken from the start fluid has to be transferred. The starting ratio 710 specifies a fraction of the first fluid that has to be transferred to the second fluid during the first operation, and the end ratio 712 specifies a fraction of the first fluid that has to be transferred into the second fluid during a second operation mode. Switching between the first and second operation modes is performed in response of the counter indicating a predefined iteration number. Instead of a predefined iteration number, switching between the first and second operation modes is also triggered when the counter is driven in a count-down mode and when the counter equals zero. Typically, the actual operation mode of the fluid manipulation means is stored by operation mode identifier 716 indicating whether the first or second operational mode of the fluid manipulation means is actually active.

Switching between the two operational modes can be effectively performed by means of a comparison between the number displayed in counter 702 and the number specified by the iteration number field 714. For example, when the counter number is larger than the iteration number 714, the fluid manipulation means is no longer active.

Figure 8:
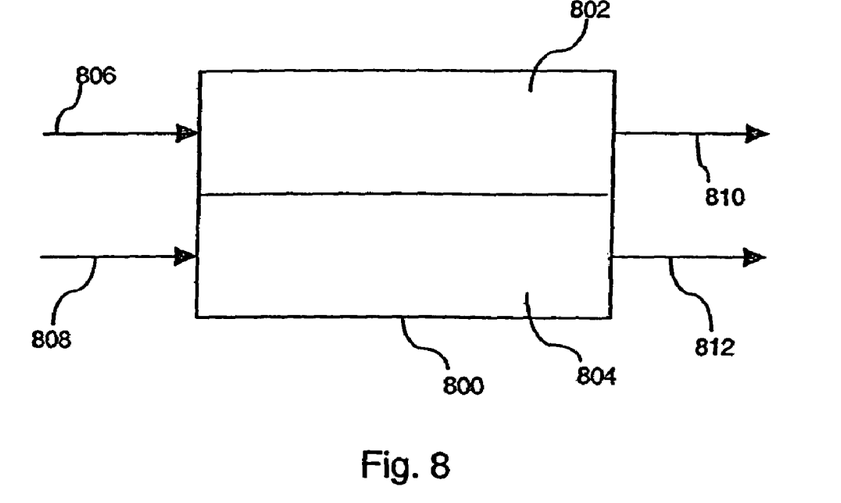
FIG. 8 shows a schematic block diagram of a station with an imbalanced constellation of fluids.

FIG. 8 illustrates an example of a station 800 to which a fluid manipulation means depicted in FIG. 7 is applied to restore a balance between the two amounts of fluid. The station 800 performs two operations 802 and 804. Operation 802 serves to process the incoming fluid 806 to a fluid 810, whereas operation 804 processes fluid 808 to a fluid 812. It is further assumed that the processing capacity of the station 800 is distributed equally between the two operations 802 and 804.

Additionally, there exists a certain imbalance between the amount of fluids 810 and 812. For instance, fluid 810 has an amount of 50, whereas the amount of fluid 812 only reaches 10. It is assumed that the fluids 810 and 812 are continuously processed by the next successive station. For instance, for each simulation cycle, the successive station processes one amount unit of incident fluids 810, 812. The fluid manipulation means for restoring the balance between the amount units of the fluids 810, 812 may feature a description block 704, wherein the start fluid 706 equals 806 and the target fluid equals fluid 808.

Here, the starting ratio 710 equals 100%, specifying that prior to activating the fluid manipulation means, the station 800 will process fluid 808 at the expense of fluid 806. The end ratio 712 may equal 50%, indicating that after switching the fluid manipulation means to the second operational mode, i.e. restoring the balance between the amounts of the outgoing fluids, then, operations 802, 804 share equally the resources of station 800.

The iteration numeral 714 further specifies the number of iterations and/or the amount of fluid transferred after which the balance needs restoring. In the present example, the iteration number equal 40. After 40 simulation cycles, the operation 804 will have processed 40 amount units of fluid 808 resulting in an increase of fluid 814 of up to an amount of 50. Taking into account the processing of the outgoing fluid 810, 812 by the next station, an equal amount of 50 may be reduced to an equal amount of 10. Nevertheless, after reaching the required balance of fluid amounts, the fluid manipulation means instructs the station 800 to continue with the target ratio that is specified by the entry 712. The counter 702 counts the simulation cycles or the amounts for which the fluid manipulation means 700 is active. By comparing the counter state to the iteration number 714, the activation and deactivation of the fluid manipulation means can be effectively performed.

Alternatively, the counter may also be implemented by initializing the counter 702 to 40 and performing a count-down operation. During the count-down procedure, the first operational mode is applied until the counter equals zero. Then, the operation mode switches to the second operational mode and the station continues to process the first and second fluids 806, 808 with equally split resources.

A more detailed description of the general fluid model and the associate inventive assignment of station resources to the various fluids is given in the next sections.

Hereinafter, the fluid model of the present invention will be described mathematically. Reference is made to the mathematical definition of terms used in the framework of fluid models according to the publication "Dynamic scheduling of a multi class fluid network" by H. Chen and D. D. Yao, Operations Research, 41:1104-1115, 1993. The network of the fluid model contains a plurality of different fluids or various fluid classes $C=\{1, \ldots, C\}$. Moreover, $S=\{1, \ldots, S\}$ denotes a plurality of stations that process the fluids. The mapping $s:C \rightarrow S$ defines the station $s(k)$ that processes fluid k. Let $C(i)=\{k \in C | s(k)=i\}$ for all $i \in S$ be the plurality of all fluids that are assigned with station i. Each fluid is assigned exactly to one station, i.e. $C(i) \cap C(j)=0, i \neq j, i, j \in S$.

Let $P=(p_{ij})_{i,j \in C}$ be the routing matrix of the fluid network that specifies the amount $0 \leq p_{i,j} \leq 1$ of fluid i that is transferred to fluid j after it has been processed at the station. The amount $1-\Sigma_{k \in C} p_{j,k}$ is the scarp that occurs after fluid j has been processed.

$\lambda_k(t)$ is the cumulative inflow of fluid k from the outside world during the time interval [0, t]. Further, $\mu_k(t)$ is the potential outflow of fluid k during [0, t], if station s(k) has devoted all of its capacity to processing fluid k exclusively. Further, $q(t)=q_k(t))_{k \in C}$ represents the vector of the work in process levels, i.e. the amount of fluid k at time t.

For simulating the fluid flow through the network, the decision which fluid is to be processed when has to be made. The network flow is considered in constant discrete time intervals $\tau$. The decision variables for the network scheduling are $x_k, k \in C, 0 \leq x_k \leq 1$, $x_k$ being the fraction of the time interval $\tau$ that station s processes fluid k. For each station a capacity constraint can be defined as:

$$\sum_{k \in C(i)} x_k \leq 1 \text{ for all } i \in S,$$

i.e., only the time $\tau$ can be devoted to process the fluids at station i.

Assuming N to be the maximum number of iterations and let $n=1, 2, \ldots, N$ be the counter of the iterations. Then the iterative simulation of the flow of the fluids can be described by the following steps:
1. initialize: $n=0, t=t_0, q'=q(0)$,
2. determine: $x_k(t)$,
3. update the point of time: $t_{n+1}=t_n+\tau$,
4. update inventories $q':=q'+(\lambda-(I-P^T)\Lambda x)\tau$,
5. $n:=n+1$,
6. repeat steps 2 through 5 until a stop criterion is successfully invoked.

The mathematical steps correspond to the flowchart illustrated in FIG. 4.

Scheduling of High Priority Fluids

In the following, a mathematical description is given of how to assign a station's resources to high priority fluids. This mathematical description basically refers to the flowchart illustrated in FIG. 5. Here, $H_i=\{1, \ldots, H_i\}$ denotes a plurality of fluids that are to be scheduled as high priority fluids at station i and $0 \leq P_k^{max} \leq 1$ denotes the maximum fraction that fluid k can be assigned, i.e. $0 \leq x_k \leq P_k^{max}$. Moreover, $0 \leq P^{max} \leq 1$ is the overall maximum time fraction that can be used for priority fluids at each station, i.e.

$$\sum_{k \in H_i} x_k \leq P^{max} \text{ for all } i \in S.$$

For instance, $P^{max}=1$ denotes that the entire capacity of a station can be dedicated to high priority fluids. In such cases where high priority fluids request the whole station's capacity, there is no capacity left that can be used for processing of FIFO scheduled fluids.

For the scheduling, first a workload for each fluid buffer at station i is calculated as $$w_k = \frac{q_k(t)}{R_i \tau \mu_k},$$

where $R_i$ represents the reliability of station i. The total workload can be defined as $$\sum_{k \in H_i} w_k.$$

Then, an upper constraint for the maximum time fractions have to be combined into a single consistent upper bound $U_k$ for each fluid k $$U_k = P^{max} \frac{P_k^{max}}{\sum_{k \in H_i} P_k^{max}} \quad \text{if } \sum_{k \in H_i} P_k^{max} > P^{max},$$

$$U_k = P_k^{max} \quad \text{else.}$$

Then the workload can be scaled to the maximum allowable fraction $w'_k = w_k U_k$ for all $k \in H_i$. And the total workload is given by $$W'_i = \sum_{k \in H_i} w'_k.$$

Based on these calculations, the ratios $x_k$ can be derived from the maximum allowable workload as:

$$x_k = P^{max} R_i \frac{w'_k}{W'_i}.$$

Scheduling of FIFO Fluids

In a similar manner the scheduling for the FIFO fluids can be described. The input for determining the vector $x_k$ for FIFO fluids is the vector $\theta_i, i \in S$ that is the unassigned time fraction at station i not being used by high priority fluids. Moreover, $F_i=\{1, \ldots, F\}$ defines the plurality of fluids that are scheduled as first in first out fluid at station i. As a first step, the workload is determined for each fluid $k \in F$ $$w_k = \frac{q_k(t)}{R_i \tau \mu_k}$$

The total workload is defined as $$\sum_{k \in F_i} w_k.$$

Then the fraction $x_k$ for fluid k of the time interval $\tau$ can be computed as $$x_k = \theta_i R_i \frac{w_k}{W_i}$$

for an overload case, and as $x_k = R_i w_k$ otherwise.

In the overload case $\theta_i$ is plurality to 0 as there is no capacity left for low priority fluids at station i. Otherwise, $\theta_i := \theta_i - W_i$, so that the remaining capacity is passed on to the low priority queues. The FIFO scheduling is schematically also illustrated in the flow chart of FIG. 6.

While the present invention has been particularly described, in conjunction with a specific preferred embodiment, it is evident that many alternatives, modifications and variations will be apparent to those skilled in the art in light of the present description. It is therefore contemplated that the appended claims will embrace any such alternatives, modifications and variations as falling within the true scope and spirit of the present invention.

Thus, having described the invention, what is claimed is:

1. A method of simulating a production process on the basis of a continuous fluid model with discrete time evolution, the continuous fluid model having a plurality of stations processing a plurality of fluids, at least a first station initially being assigned a first amount of at least a first fluid and a second amount of at least a second fluid, each of the at least first and second fluids being assigned a priority identifier, the simulation extending over successive simulation cycles, the method comprising:
   (a) assigning the at least first station resources to the at least first and second fluids at a predetermined time, the assignment being performed on the basis of the priority identifier of the at least first and second fluids;
   (b) incrementing the predetermined time by a simulation cycle time interval;
   (c) updating the first and second amounts of the at least first and second fluids on the basis of the assignment of the at least first station resources to the at least first and second fluids, and performing said simulation; and
   (d) modifying said production process based on results of said simulation and on the updated first and second amounts of said at least first and second fluids.

2. The method according to claim 1, wherein the at least first and second stations process a fluid by way of a fluid specific operation, wherein the selection of the fluid specific operation is determined by a fluid class identifier provided by each of the at least first and second fluids.

3. The method according to claim 2, wherein assigning the at least first station's resources to the at least first and second fluids depends on the total workload of the at least first station and the amount of first and second fluid associated with the at least first station.

4. The method according to claim 3, wherein assigning the at least first station's resources to the at least first and second fluids further comprises a station specific maximum priority threshold.

5. The method according to claim 4, wherein assigning the at least first station's resources to the at least first and second fluids further comprises a fluid specific maximum priority threshold.

6. The method according to claim 5, wherein assigning the at least first station's resources to the at least first and second fluids further comprises a first in, first out (FIFO) schedule.

7. The method according to claim 6, wherein assigning the at least first Station's resources to the at least first and second fluids comprises the steps of: (d) assigning a first fraction of the at least first station's resources to fluids with a highest ranked priority identifier, (e) assigning a second fraction of the at least first station's resources to fluids with the first in first out priority identifier, and (f) assigning a third fraction of the at least first station's resources to fluids with a lowest ranked priority identifier, the third fraction being the residual fraction of the total resources of the at least first station.

8. The method according to claim 7, wherein assigning the at least first station's resources to the at least first and second fluids further comprises the processing time of the at least first and second fluids.

9. The method according to claim 8, further comprising assigning fluid manipulation means to the at least first station, the fluid manipulation means transferring the at least first fluid to the at least second fluid.

10. The method according to claim 9, wherein the fluid manipulation means transfers the at least first fluid into the at least second fluid for a predetermined number of simulation cycles.

11. The method according to claim 10, wherein the predetermined number of simulation cycles is determined by a relative amount of the at least first fluid and the at least second fluid.

12. The method according to claim 11, wherein assigning the first amount of the at least first fluid and assigning the second amount of the at least second fluid to the at least first station is performed on the basis of an integrated simulation providing autonomous acquisition of data from a database.

13. A computer system for simulating a production process on the basis of a continuous fluid model with discrete time evolution, the continuous fluid model having a plurality of stations processing a plurality of fluids, the computer system comprising:
   a) first storage means for storing an assignment between a first amount of an at least first fluid and a second amount of an at least second fluid to an at least first station,
   b) processing means for assigning the at least first station's resources to the at least first and second fluids during a time interval of the simulation cycle, the processing means assigning a priority identifier to the at least first and second fluids, and
   c) a model generator for generating the continuous fluid model; a database for storing assignments between fluids and stations of the continuous fluid model; and a simulation server for performing the simulation based on the continuous fluid model.

14. The computer system according to claim 13 further comprising a data interface for coupling the computer system to a data gathering system providing data of a production process.

15. A computer system for simulating a production process over a plurality of simulation cycles on the basis of a continuous fluid model with a discrete time evolution, the continuous fluid model having a plurality of stations for processing a plurality of fluids, at least a first station initially assigned a first amount of at least a first fluid and a second amount of at least a second fluid, the at least first and second fluids having an assigned priority identifier, the computer system comprising the steps of:
  (a) assigning the at least first station's resources to the at least first and second fluids at a predetermined time, the assignment being performed on the basis of the priority identifier of the at least first and second fluids,
  (b) incrementing the predetermined time by a simulation cycle time interval,
  (c) updating the first and second amounts of the at least first and second fluids on the basis of the assignment of the first station's resources to the at least first and second fluids, and performing said simulation; and
  (d) modifying said production process based on results of said simulation and on the updated first and second amounts of said at least first and second fluids; and said computer system further comprising:

a model generator for generating the continuous fluid model, a database for storing assignments between fluids and stations of the continuous fluid model; and a simulation server for performing the simulation based on the continuous fluid model.

* * * * *